(12) United States Patent
Izu et al.

(10) Patent No.: US 12,343,977 B2
(45) Date of Patent: Jul. 1, 2025

(54) INTERLAYER FILM STRUCTURE FOR LAMINATED PANEL, AND LAMINATED PANEL STRUCTURE

(71) Applicant: SEKISUI CHEMICAL CO., LTD., Osaka (JP)

(72) Inventors: Yasuyuki Izu, Limburg (NL); Daisuke Nakajima, Limburg (NL); Masashi Yanai, Limburg (NL)

(73) Assignee: SEKISUI CHEMICAL CO., LTD., Osaka (JP)

( * ) Notice: Subject to any disclaimer, the term of this patent is extended or adjusted under 35 U.S.C. 154(b) by 86 days.

(21) Appl. No.: 18/034,970

(22) PCT Filed: Nov. 5, 2021

(86) PCT No.: PCT/JP2021/040883
§ 371 (c)(1),
(2) Date: May 2, 2023

(87) PCT Pub. No.: WO2022/097739
PCT Pub. Date: May 12, 2022

(65) Prior Publication Data
US 2024/0017523 A1 Jan. 18, 2024

(30) Foreign Application Priority Data

Nov. 5, 2020 (JP) .................................. 2020-185355

(51) Int. Cl.
*G02F 1/1334* (2006.01)
*B32B 7/023* (2019.01)
(Continued)

(52) U.S. Cl.
CPC ............ *B32B 7/023* (2019.01); *G02F 1/0018* (2013.01); *G02F 1/1326* (2013.01);
(Continued)

(58) Field of Classification Search
None
See application file for complete search history.

(56) References Cited

U.S. PATENT DOCUMENTS 7,245,205 B2   7/2007  Strohband et al.
2011/0143131 A1 6/2011  Nomura et al.
(Continued)

FOREIGN PATENT DOCUMENTS

CN   101533162   9/2009
CN   110178074   8/2019
(Continued)

OTHER PUBLICATIONS

International Search Report (ISR) issued Jan. 11, 2022 in International (PCT) Application No. PCT/JP2021/040883.

*Primary Examiner* — Thanh Nhan P Nguyen
(74) *Attorney, Agent, or Firm* — Wenderoth, Lind & Ponack, L.L.P.

(57) ABSTRACT

An interlayer film structure is configured to be sandwiched between two transparent panels. The interlayer film structure includes a first light-modulating film capable of switching between light transmission and light scattering, and a second light-modulating film capable of adjusting a visible light transmittance. The first light-modulating film and the second light-modulating film are arranged in a thickness direction.

18 Claims, 5 Drawing Sheets

(51) Int. Cl.
*G02F 1/00* (2006.01)
*G02F 1/13* (2006.01)
*G02F 1/167* (2019.01)
*G02F 1/169* (2019.01)

(52) U.S. Cl.
CPC .......... *G02F 1/13345* (2021.01); *G02F 1/167* (2013.01); *G02F 1/169* (2019.01); *B32B 2250/40* (2013.01)

(56) References Cited

U.S. PATENT DOCUMENTS

| | | |
|---|---|---|
| 2017/0361576 A1 | 12/2017 | Legrand et al. |
| 2018/0210272 A1 | 7/2018 | Van Oosten |
| 2020/0061974 A1 | 2/2020 | Dröge et al. |
| 2021/0339609 A1* | 11/2021 | Farreyrol .......... B32B 17/10458 |
| 2022/0100011 A1* | 3/2022 | Droste ................. G02F 1/1334 |

FOREIGN PATENT DOCUMENTS

| | | |
|---|---|---|
| CN | 210792336 | 6/2020 |
| EP | 3 570 094 | 11/2019 |
| JP | 2000-19494 | 1/2000 |
| JP | 2012-99650 | 5/2012 |
| JP | 2018-508439 | 3/2018 |
| JP | 2020-30355 | 2/2020 |
| JP | 2020-510232 | 4/2020 |
| JP | 2020-95084 | 6/2020 |
| WO | 2010/021276 | 2/2010 |
| WO | 2012/043797 | 4/2012 |
| WO | 2017/008881 | 1/2017 |
| WO | 2020/072709 | 4/2020 |

* cited by examiner

INTERLAYER FILM STRUCTURE FOR LAMINATED PANEL, AND LAMINATED PANEL STRUCTURE

TECHNICAL FIELD

The present invention relates to an interlayer film structure for a laminated panel, to be used with being sandwiched between two transparent panels, and a laminated panel structure comprising the interlayer film structure for a laminated panel.

BACKGROUND ART

Car members in self-driving cars and EV cars increasingly tend to be actively functionalized in terms of functions, regardless of interior or exterior decorating of cars. One such active functionalization, conventionally studied, has been a windshield comprising an electrically controllable sun visor, and, for example, application of a light-modulating film such as a polymer dispersion type liquid crystal (PDLC) film to a sun visor has been studied as described in JP 2020-510232 A.

PDLC films not only provide light scattering by irregular orientation of liquid crystals when no voltage is applied, but also have high light transmissiveness by alignment of liquid crystals when a voltage is applied. Thus, PDLC films can be placed on windshields and thus used as replacements for mechanical sun visors.

Translucent members comprising light-modulating films, such as windows, have been conventionally variously improved, and, for example, JP 2020-30355 A has disclosed a light-modulating apparatus where two light-modulating layers each comprising a liquid crystal layer are provided from the viewpoint of greater enhancement in light-blocking ability. Light-modulating films known include, in addition to those comprising liquid crystals such as PDLCs, an SPD (Suspended Particle Device) film comprising a light-modulating layer where a light-adjusting suspension is dispersed in a resin matrix, as shown in WO 2010/021276.

CITATION LIST

Patent Literatures

PTL 1: JP 2020-510232 A
PTL 2: JP 2020-30355 A
PTL 3: WO 2010/021276

SUMMARY OF INVENTION

Technical Problem

Meanwhile, designs of self-driving cars and EV cars, which attract attention, are a full glass top design where even the roof is covered with glass, and a seamless design where a seam portion between glass and the body is removed, and, in particular, such a roof design attracts attention. A full glass top design structure, where the area of glass on the roof portion is larger, is practically difficult to introduce because a space for mounting a mechanical shade such as a window-opening unit cannot be held.

Accordingly, a large-area roof structure may cause entry of much more sunlight and heat rays from overhead, and thus is studied with respect to blocking of outside light by introduction of deep color laminated glass or the like, but use of deep color laminated glass hardly provides the advantage of obtaining a sense of openness by incorporation of roof glass, and cannot sufficiently meet a user need.

There is then studied application of a light-modulating film such as PDLC as an alternative to a mechanical shade, to roof glass. However, PDLC is insufficient in control of the amount of heat rays entering a car, and a combination thereof with colorless or light color glass or laminated glass cannot sufficiently enhance heat insulation ability. On the other hand, a combination of PDLC with deep color glass or deep color laminated glass, while ensures heat insulation ability, does not achieve any sufficient sense of openness as described above and does not achieve sufficient light transmissiveness even in the case of a light-transmission mode of PDLC.

An object of the present invention is then to provide an interlayer film structure for a laminated panel, in which not only the entry of heat rays is appropriately prevented, but also a sufficient sense of openness is obtained, and sufficient light transmissiveness is obtained in a light-transmission mode.

Solution to Problem

The present inventors have made intensive studies, and as a result, have found that the above problems can be solved by a combination use of two or more specified light-modulating films, and have completed the following present invention. The present invention provides the following [1] to [35].

[1] An interlayer film structure for a laminated panel, to be used with being sandwiched between two transparent panels, the structure comprising a first light-modulating film capable of switching between light transmission and light scattering and a second light-modulating film capable of adjusting a visible light transmittance, wherein the first and second light-modulating films are arranged in a thickness direction.

[2] The interlayer film structure for a laminated panel according to [1], wherein the second light-modulating film is disposed closer to the outdoor side than the first light-modulating film.

[3] The interlayer film structure for a laminated panel according to [1] or [2], comprising an internal transparent adhesion layer that is disposed between the first light-modulating film and the second light-modulating film to bond these light-modulating films.

[4] The interlayer film structure for a laminated panel according to [3], wherein the first and second light-modulating films are thermocompression bonded with the internal transparent adhesion layer being interposed therebetween.

[5] The interlayer film structure for a laminated panel according to any one of [1] to [4], comprising a surface-transparent adhesion layer on an outermost surface of the interlayer film structure for a laminated panel.

[6] The interlayer film structure for a laminated panel according to any one of [1] to [5], wherein a visible light transmittance measured in the first light-modulating film in a light-transmission mode, in a laminated panel structure obtained by bonding two sheets of clear glass having a thickness of 2.5 mm with the interlayer film structure for a laminated panel being interposed therebetween, is adjustable to 1% or less and 10% or more by the second light-modulating film.

[7] The interlayer film structure for a laminated panel according to any one of [1] to [6], wherein a Tds (Solar direct transmittance) measured in the first light-modulating film in a light-transmission mode, in a laminated panel structure obtained by bonding two sheets of clear glass having a thickness of 2.5 mm with the interlayer film structure for a laminated panel being interposed therebetween, is adjustable to 55% or less.

[8] The interlayer film structure for a laminated panel according to any one of [1] to [7], wherein a haze value measured in the first light-modulating film in a light-transmission mode, in a laminated panel structure obtained by bonding two sheets of clear glass having a thickness of 2.5 mm with the interlayer film structure for a laminated panel being interposed therebetween, is adjustable to 40% or less.

[9] The interlayer film structure for a laminated panel according to any one of [1] to [8], wherein respective peripheral edges of the first and second light-modulating films are disposed on an inner circumferential side by 10 mm or more from peripheral edges of the transparent panels.

[10] The interlayer film structure for a laminated panel according to [9], comprising a sealing material provided on an outer circumferential side with respect to the first and second light-modulating films.

[11] The interlayer film structure for a laminated panel according to any one of [1] to [10], comprising a touch sensor that controls at least any of the first and second light-modulating films, in an interior of the interlayer film structure for a laminated panel.

[12] The interlayer film structure for a laminated panel according to any one of [1] to [11], wherein the first light-modulating film is divided to a plurality of independently controllable segments.

[13] The interlayer film structure for a laminated panel according to any one of [1] to [12], wherein the first light-modulating film is any of a polymer dispersion type liquid crystal film and a polymer network type liquid crystal.

[14] The interlayer film structure for a laminated panel according to any one of [1] to [13], wherein the second light-modulating film is any of an electrochromic film, an SPD film, and an electrophoresis film device.

[15] The interlayer film structure for a laminated panel according to any one of [1] to [14], wherein the first light-modulating film has a visible light transmittance of 60% or more and 100% or less and a haze value of 0% or more and 30% or less in a light-transmission mode.

[16] The interlayer film structure for a laminated panel according to any one of [1] to [15], wherein the first light-modulating film has a visible light transmittance of 0% or more and 40% or less and a haze value of 70% or more and 100% or less in a light-scattering mode.

[17] The interlayer film structure for a laminated panel according to any one of [1] to [16], wherein the second light-modulating film is capable of switching between a light-transmission mode and a light-shielding mode and has a visible light transmittance of 25% or more and 100% or less and a haze value of 0% or more and 30% or less in a light-transmission mode.

[18] The interlayer film structure for a laminated panel according to any one of [1] to [17], wherein the second light-modulating film is capable of switching between a light-transmission mode and a light-shielding mode and has a visible light transmittance of less than 25% and a haze value of less than 60% in a light-shielding mode.

[19] The interlayer film structure for a laminated panel according to any one of [3] to [18], wherein the internal transparent adhesion layer is a thermoplastic resin layer.

[20] The interlayer film structure for a laminated panel according to [19], wherein a thermoplastic resin in the internal transparent adhesion layer is one or more selected from the group consisting of an ethylene-vinyl acetate copolymer, a polyurethane-based thermoplastic elastomer, a polyolefin-based resin, a cyclic olefin-based resin, and a polyvinyl acetal-based resin.

[21] The interlayer film structure for a laminated panel according to any one of [5] to [20], wherein the surface-transparent adhesion layer is a thermoplastic resin layer.

[22] The interlayer film structure for a laminated panel according to [21], wherein a thermoplastic resin in the surface-transparent adhesion layer is one or more selected from the group consisting of an ethylene-vinyl acetate copolymer, a polyurethane-based thermoplastic elastomer, a polyolefin-based resin, a cyclic olefin-based resin, and a polyvinyl acetal-based resin.

[23] The interlayer film structure for a laminated panel according to any one of [5] to [22], comprising the surface-transparent adhesion layer, the first light-modulating film, the internal transparent adhesion layer, the second light-modulating film, and the surface-transparent adhesion layer in the listed order.

[24] The interlayer film structure for a laminated panel according to any one of [10] to [23], wherein the sealing material is formed by a thermoplastic resin.

[25] The interlayer film structure for a laminated panel according to [24], wherein the thermoplastic resin in the sealing material is one or more selected from the group consisting of an ethylene-vinyl acetate copolymer, a polyurethane-based thermoplastic elastomer, a polyolefin-based resin, a cyclic olefin-based resin, and a polyvinyl acetal-based resin.

[26] The interlayer film structure for a laminated panel according to any one of [1] to [25], wherein a haze value and a visible light transmittance measured in the first light-modulating film in a light-scattering mode, in a laminated panel structure obtained by bonding two sheets of clear glass having a thickness of 2.5 mm with the interlayer film structure for a laminated panel being interposed therebetween, are respectively adjustable to 70% or more and 20% or less.

[27] The interlayer film structure for a laminated panel according to any one of [1] to [26], wherein a Tds measure in a light-scattering mode of the first light-modulating film in a laminated panel structure obtained by bonding two sheets of clear glass having a thickness of 2.5 mm with the interlayer film structure for a laminated panel being interposed therebetween is less than 10%.

[28] The interlayer film structure for a laminated panel according to any one of [1] to [27], wherein the first light-modulating film comprises two base material films and a light-modulating layer disposed between the two base material films.

[29] The interlayer film structure for a laminated panel according to any one of [1] to [28], wherein the second light-modulating film comprises two base material films and a light-modulating layer disposed between the two base material films.

[30] A laminated panel structure comprising the interlayer film structure for a laminated panel according to any one of [1] to [29], and two transparent panels, wherein
    the interlayer film structure for a laminated panel is disposed with being sandwiched between the two transparent panels.

[31] The laminated panel structure according to [30], having a thickness of 7 mm or less.

[32] The laminated panel structure according to or [31], for car roof glass.

[33] The laminated panel structure according to or [31], for a building.

[34] Use of the interlayer film structure for a laminated panel according to any one of [1] to [29], or the laminated panel structure according to [30] or [31], in car roof glass.

[35] Use of the interlayer film structure for a laminated panel according to any one of [1] to [29], or the laminated panel structure according to [30] or [31], in a building.

Advantageous Effects of Invention

In the present invention, not only the entry of heat rays is appropriately prevented, but also a sufficient sense of openness is obtained, and sufficient light transmissiveness is obtained in a light-transmission mode.

DESCRIPTION OF EMBODIMENTS

<Interlayer Film Structure for Panel>

Figure 1:
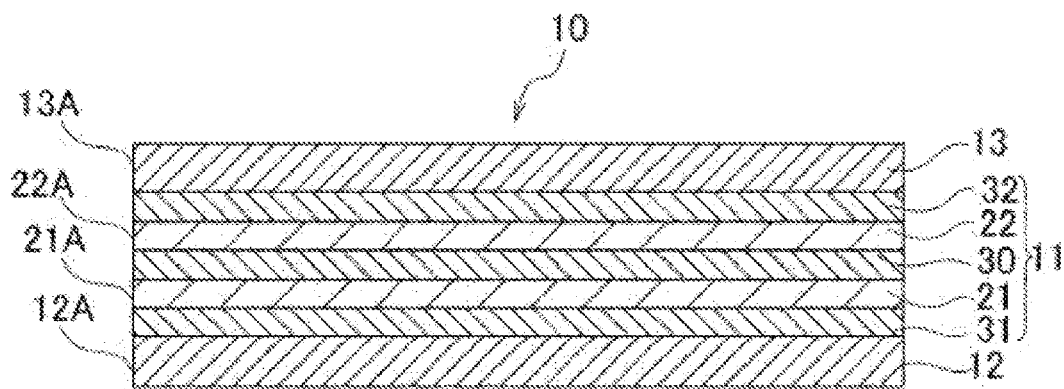
FIG. 1 is a schematic cross-sectional view illustrating a laminated panel structure according to one embodiment of the present invention.

The interlayer film structure for a laminated panel (hereinafter, also referred to as "interlayer film structure") of the present invention is used with being sandwiched between two transparent panels, and comprises first and second light-modulating films arranged in the thickness direction. In the present invention, light-modulating films are adopted which are a first light-modulating film capable of switching between light transmission and light scattering and a second light-modulating film capable of adjusting a visible light transmittance.

The interlayer film structure of the present invention, in which the modes of the first and second light-modulating films are appropriately combined, thus can block light to thereby appropriately prevent the entry of heat rays. In addition, the first light-modulating film can be in a light-transmission mode and furthermore the second light-modulating film can adjust the transmittance of visible light depending on the exterior state, thereby allowing light transmissiveness to be increased and allowing a sense of openness to be obtained with suppression of light transmissiveness, and thus a laminated panel structure sufficiently adapted to a user need can be provided.

First Light-Modulating Film

The first light-modulating film is a light-modulating member capable of switching between light transmission and light scattering. The first light-modulating film has a high visible light transmittance in a light-transmission mode. The first light-modulating film has a high haze value and furthermore is reduced in visible light transmittance in a light-scattering mode, as compared with a light-transmission mode. In the first light-modulating film, switching between a light-transmission mode and a light-scattering mode is performed by application or no application of a voltage.

A polymer dispersion type liquid crystal (PDLC) film is preferably used as the first light-modulating film. When the PDLC film is used, the visible light transmittance is easily increased in a light-transmission mode, and high light scattering is obtained in a light-scattering mode and the haze value is easily increased in a light-scattering mode. A polymer network type liquid crystal (PNLC) can also be used in the first light-modulating film.

The first light-modulating film comprises, for example, two base material films and a light-modulating layer disposed between the two base material films. Examples of such a base material film include a resin film with, as a resin component, a polyester resin such as polyethylene terephthalate or polyethylene naphthalate, an acrylic resin, a cellulose derivative such as triacetyl cellulose (TAC), a polyethersulfone (PES) resin, a polyimide resin, or the like. In particular, a polyester resin film is preferred and particularly a polyethylene terephthalate film is more preferred, from the viewpoint of handleability or the like.

Electrode layers may be provided on respective surfaces of the two base material films, the surfaces being located facing the light-modulating layer. Any conventionally known electrode material having transparency can be used for the electrode layers without particular limitation, and examples thereof include an indium tin oxide (ITO) conductive film, a tin oxide conductive film, a zinc oxide conductive film, and a polymer conductive film. An extraction electrode may be connected to the electrode layers and a voltage may be applied between the electrode layers via the extraction electrode.

The light-modulating layer in the first light-modulating film is, for example, a liquid crystal layer, and when the first light-modulating film is a polymer dispersion type liquid crystal (PDLC) film, the liquid crystal layer is constituted by a polymer dispersion type liquid crystal (PDLC). Examples of the polymer dispersion type liquid crystal include one called network type liquid crystal where a network structure is formed in the liquid crystal layer.

Examples of the liquid crystal layer include one where a space for filling the interior with a liquid crystal by a spacer or the like is formed and the space is filled and sealed with the liquid crystal, and the spacer may be absent. The type of the liquid crystal may be any type, and may be a TN type or an STN type. An oriented film may be appropriately provided between the light-modulating layer and the electrode layers. The oriented film can also be provided to thereby allow the first light-modulating film to be of a reverse type described below.

In the first light-modulating film, a voltage is applied between the electrode layers to thereby result in the change in orientation state of the liquid crystal layer and then switching between light transmission and light scattering. The first light-modulating film may be either of a normal type or of a reverse type. The normal type is a type providing a transmission state by application of a voltage (voltage ON) or a scattering state by application of no voltage (voltage OFF). The reverse type is a type providing a transmission state by application of no voltage or a scattering state by application of a voltage.

The first light-modulating film is high in visible light transmittance and also low in haze value in a light-transmission mode, as described above. The visible light transmittance of the first light-modulating film in a light-transmission mode is specifically, for example, 60% or more, preferably 70% or more, more preferably 75% or more. The first light-modulating film can have such a visible light transmittance in a light-transmission mode to thereby provide sufficiently high light transmissiveness of the laminated panel structure, and a sufficient sense of openness when used in, for example, roof glass of a car.

The haze value of the first light-modulating film in a light-transmission mode is, for example, 30% or less, preferably 20% or less, further preferably 10% or less.

The visible light transmittance of the first light-modulating film in a light-transmission mode may be 100% or less, and is practically 99% or less, and the haze value of the film may be a 0% or more, and is practically, for example, 1% or more.

On the other hand, the haze value of the first light-modulating film in a light-scattering mode is, for example, 70% or more, preferably 80% or more, more preferably 90% or more. Such a higher haze value in a light-scattering mode results in an increase in light-blocking ability and enables the entry of heat rays to be appropriately prevented in a light-scattering mode. This also enables peeping from the exterior side of the laminated panel structure to be prevented.

The visible light transmittance of the first light-modulating film in a light-scattering mode is lower than that in a light-transmission mode, and is, for example, 40% or less, preferably 20% or less, more preferably 10% or less. When the light transmittance in a light-scattering mode is lower as described above, the entry of heat rays can be appropriately prevented in a light-scattering mode.

The haze value of the first light-modulating film in a light-scattering mode may be 100% or less, and is practically about 99% or less. The visible light transmittance may be a 0% or more, and is practically, for example, about 1% or more.

The first light-modulating film may be any one of in a light-scattering mode and a light-transmission mode in the state of application of no voltage and may have a haze value and a visible light transmittance falling within the above respective ranges in such any one mode. The first light-modulating film may also be any other of in a light-scattering mode and a light-transmission mode in the state of application of a voltage and may have a haze value and a visible light transmittance falling within the above respective ranges in such any other mode, and the voltage value to be applied is not limited and the haze value and the visible light transmittance may be achieved at any voltage value. The same also applies to a light-transmission mode and a light blocking mode of the second light-modulating film, described below.

The thickness of the first light-modulating film is not particularly limited, and is, for example, 0.05 mm or more and 2 mm or less, preferably 0.1 mm or more and 1 mm or less, more preferably 0.2 mm or more and 0.8 mm or less.

A commercially available product can be used as the first light-modulating film. Specific examples include a normal type [light-transmission mode: haze value 5%, parallel transmittance 82%, light-scattering mode: haze value 98%, parallel transmittance 1% (catalogue values)] and a reverse type [light-transmission mode: haze value 10%, parallel transmittance 80%, light-scattering mode: haze value 92%, parallel transmittance 7% (catalogue values)] of "LC MAGIC" series manufactured by TOPPAN INC. Further examples include a window type [light-transmission mode: haze value 6%, parallel transmittance 74%, light-scattering mode: haze value 86%, parallel transmittance 5% (catalogue values)] of "UMU" manufactured by NSG UMU PRODUCTS CO., LTD. Examples include "LC-W" from Gauzy Ltd.

Second Light-Modulating Film

The second light-modulating film is a light-modulating member capable of adjusting a visible light transmittance. The second light-modulating film may switch between a light-transmission mode providing a higher visible light transmittance and a light-shielding mode providing a lower visible light transmittance.

The second light-modulating film, even when is in a light-shielding mode, does not provide much light scattering and is not so increased in haze value, and has a lower haze value than the haze value of the first light-modulating film in a light-scattering mode, as described above.

Examples of the second light-modulating film include an electrochromic film, an SPD film, and an electrophoresis film device, and in particular, an SPD film is preferred. When such a film is used, the visible light transmittance can be reduced without much generation of light scattering. Thus, when the first light-modulating film is in a light-transmission mode and furthermore the second light-modulating film is in a light-shielding mode, the light transmittance can be suppressed so that light is not completely blocked with light scattering being suppressed, and thus use in window glass or the like not only prevents transmission of heat rays to some extent, but also easily provides a sense of openness.

The second light-modulating film comprises, for example, two base material films and a light-modulating layer disposed between the two base material films. Examples of such a base material film include a resin film, and the resin for use in the resin film is as described with respect to the first light-modulating film, and is preferably a polyester resin film and, in particular, more preferably a polyethylene terephthalate film from the viewpoint of handleability or the like. Accordingly, both the base material films of the first and second light-modulating films are preferably polyester resin films, further preferably polyethylene terephthalate films.

Also in the second light-modulating film, electrode layers may be provided on respective surfaces of the two base material films, the surfaces being located facing the light-modulating layer. Any conventionally known electrode material having transparency can be used for the electrode layers, and examples thereof include an indium tin oxide (ITO) conductive film, a tin oxide conductive film, a zinc oxide conductive film, and a polymer conductive film. An extraction electrode may be connected to the electrode layers and a voltage may be applied between the electrode layers via the extraction electrode.

<<SPD Film>>

When the light-modulating film is an SPD (Suspended Particle Device) film, the light-modulating layer is a layer comprising a resin matrix and a light-adjusting suspension dispersed in the resin matrix.

The resin matrix includes a polymer medium, and the light-adjusting suspension is one where a light-adjusting particle is in a flowable state and is dispersed in a dispersion medium. The polymer medium and the dispersion medium (the dispersion medium in the light-adjusting suspension), here used, are those that are phase-separable from each other when the polymer medium and a cured product thereof and the dispersion medium are at least formed into a film. A polymer medium and a dispersion medium incompatible or partially compatible with each other are preferably used in combination.

Examples of the polymer medium include a resin having a substituent having an ethylenically unsaturated bond, and one that comprises a photopolymerization initiator and that is to be cured by irradiation with energy line such as ultraviolet ray, visible ray, or electron beam. The resin having an ethylenically unsaturated bond is preferably a silicone-based resin, an acrylic resin, a polyester resin, or the like.

Not only the resin having a substituent having an ethylenically unsaturated bond, but also an organic solvent-soluble resin or a thermoplastic resin, for example, polyacrylic acid or polymethacrylic acid can also be used in combination as a constituent material of the polymer medium.

An additive, for example, a coloring inhibitor such as dibutyltin dilaurate may be, if necessary, added into the polymer medium. The polymer medium may further comprise a solvent.

The dispersion medium in the light-adjusting suspension, here used, is preferably a liquid copolymer which serves as the dispersion medium in the light-adjusting suspension, which is to be selectively attached to the light-adjusting particle to cover the particle, which acts so as to allow the light-adjusting particle to be transferred to a droplet phase separated in phase separation from the polymer medium, which has no electric conductivity, and which has no affinity with the polymer medium.

The liquid copolymer is, for example, preferably a (meth)acrylate oligomer having a fluoro group and/or a hydroxyl group, more preferably a (meth)acrylate oligomer having a fluoro group and a hydroxyl group.

The light-adjusting suspension for use in the present invention is one where the light-adjusting particle is flowably dispersed in the dispersion medium. The light-adjusting particle here used is, for example, a poly-iodide crystal, and is preferably a needle small crystal of poly-iodide.

The SPD film may be such that, when a voltage is applied between both the electrode layers, the light-adjusting particle is oriented in the thickness direction to thereby result in an increase in light transmittance, for example, transmittance in a specified wavelength band.

A primer layer may also be appropriately provided between the light-modulating layer and the electrode layers in the SPD film.

The SPD film is low in light transmissiveness and is in a light-shielding mode, when no voltage is applied (voltage OFF) between the electrode layers. On the other hand, when a voltage is applied (voltage ON) between the electrode layers, for example, the transmittance in a specified wavelength band is increased to result in switching from a light-shielding mode to a light-transmission mode. The SPD film may be not only changed in visible light transmittance, but also changed in color tone in irradiation with visible light, and can also be, for example, so as to be colorless and transparent when a voltage is applied and, on the other hand, have a color tone such as blue when no voltage is applied. Herein, the SPD film, when modified in magnitude of the voltage value to be applied between the electrodes, is also changed in magnitude of the visible light transmittance in a light-transmission mode.

<<Electrochromic Film>>

When the second light-modulating film is an electrochromic film, the light-modulating layer may comprise an electrochromic material. The electrochromic material is not limited as long as it is a compound having electrochromic characteristics, and may be any of an inorganic compound, an organic compound, and a mixed valence complex.

Examples of the inorganic compound include $Mo_2O_3$, $Ir_2O_3$, $NiO$, $V_2O_5$, $WO_3$, and $TiO_2$, and in particular $WO_3$ is preferred. Examples of the organic compound include a polypyrrole compound, a polythiophene compound, a polyparaphenylene vinylene compound, a polyaniline compound, a polyacetylene compound, a polyethylene dioxythiophene compound, a metallophthalocyanine compound, a viologen compound, a viologen salt compound, a ferrocene compound, a dimethyl terephthalate compound, and a diethyl terephthalate compound, and in particular a polyacetylene compound is preferred. Examples of the mixed valence complex include a Prussian blue type complex ($KFe[Fe(CN)_6]$ and the like).

The electrochromic film is, for example, changed in transmittance in a specified wavelength band by application of a voltage between the electrode layers, and thus the light-modulating member is turned from the state where the visible light transmittance is high (light-transmission mode) to the state where the visible light transmittance is low (light-shielding mode). The electrochromic film may also be together changed in color tone in irradiation with visible light, and can also be, for example, colorless and transparent when no voltage is applied and, on the other hand, have a color tone such as blue, yellow, green, or red when a voltage is applied.

<<Electrophoresis Film Device>>

The electrophoresis film device comprises, for example, an electrophoresis portion between two base materials comprising electrode layers. The electrophoresis portion comprises, for example, an electrophoresis particle, and a dispersant that disperses the electrophoresis particle. Also in the electrophoresis film device, the state where the visible light transmittance is high (light-transmission mode) and the state where the visible light transmittance is low (light-shielding mode) can be turned to each other by whether or not a voltage is applied between the electrode layers. Specific examples of the electrophoresis film device are described in detail in US 2016/0124284 A and the like.

The second light-modulating film in a light-transmission mode has a visible light transmittance that is equal to or more than a certain value, and is reduced in haze value. The visible light transmittance of the second light-modulating film in a light-transmission mode is specifically, for example, 25% or more, preferably 30% or more, more preferably 40% or more. The second light-modulating film has such a visible light transmittance, and both the first and second light-modulating films are each in a light-transmission mode, thereby enabling the laminated panel structure to be increased in light transmissiveness and enabling a sufficient sense of openness to be obtained and enabling the exterior to be observed at high visibility, in the case of use in, for example, window glass of a car, particularly roof glass thereof.

The haze value of the second light-modulating film in a light-transmission mode is, for example, 30% or less, preferably 20% or less, further preferably 10% or less. The visible light transmittance of the second light-modulating film in a light-transmission mode may be 100% or less, or may be practically 70% or less, and the haze value may be 0% or more and is practically 1% or more.

On the other hand, the haze value of the second light-modulating film in a light-shielding mode is, for example, less than 60%, preferably less than 50%, more preferably less than 40%. If the haze value in a light-shielding mode can be thus reduced, not only light-blocking ability can be increased, but also straight traveling ability of transmitted light can be kept. Thus, when the first light-modulating film is in a light-transmission mode and the second light-modulating film is in a light-shielding mode, not only the entry of heat rays can be appropriately prevented, but also a certain sense of openness can be ensured. On the other hand, the haze value of the second light-modulating film in a light-shielding mode is not particularly limited, and is generally higher than the haze value of the second light-modulating film in a light-transmission mode.

The visible light transmittance of the second light-modulating film in a light-shielding mode is lower than that in a light-transmission mode, and is, for example, less than 25%, preferably 20% or less, more preferably 10% or less. When the light transmittance in a light-shielding mode is reduced as described above, the entry of heat rays can be appropriately prevented in a light-shielding mode.

The visible light transmittance of the second light-modulating film in a light-shielding mode is further preferably 5% or less from the viewpoint that the second light-modulating film is in a light-shielding mode and furthermore the first light-modulating film is in a light-transmission mode to thereby allow a sense of openness in the exterior to be ensured with avoidance of glare of sunlight in the daytime.

The visible light transmittance of the second light-modulating film in a light-shielding mode is not particularly limited, and may be, for example, 0.5% or more, or may be 1% or more.

The thickness of the second light-modulating film is not particularly limited, and is, for example, 0.05 mm or more and 2 mm or less, preferably 0.1 mm or more and 1 mm or less, more preferably 0.2 mm or more and 0.8 mm or less.

A commercially available product can be used as the second light-modulating film. Specific examples of the SPD film include a Light type [light-transmission mode: visible light transmittance 45 to 65% (50 to 100 V), haze value 6%, light-shielding mode: visible light transmittance 3% (catalogue values)] and a Dark type [light-transmission mode: visible light transmittance 30 to 53% (50 to 100 V), haze value 6%, light-shielding mode: visible light transmittance 1% (catalogue values)] of "LCF-1103DHA" manufactured by Hitachi Chemical Co., Ltd.

Further examples of the SPD film include "SPD" from Gauzy Ltd. Examples thereof also include an electrochromic film from Ynvisible Interactive Inc., and examples of the electrophoresis film device include "E-Skin" from Signify Holding.

The laminated panel structure of the present invention is used for various kinds of window glass as described below, and may be used as a member that partitions the indoor and the outdoor, and the second light-modulating film is preferably disposed closer to the outdoor side than the first light-modulating film. When the second light-modulating film is disposed on the outdoor side, outside light incident from the outdoor to the indoor, such as sunlight, is blocked by the second light-modulating film and the amount thereof for radiation of the PDLC film and the like constituting the first light-modulating film is decreased. Thus, the first light-modulating film, for example, the PDLC film low in light resistance is improved in durability, and durability of the entire interlayer film structure is also enhanced.

[Switch]

The interlayer film structure may comprise a switch member. The switch member is a member for controlling the first and second light-modulating films. The switch member may control whether or not a voltage is applied between the electrode layers of the first light-modulating film by switch input. Thus, the switch member can switch a light-transmission mode and a light-scattering mode of the first light-modulating film.

The switch member may control whether or not a voltage is applied between the electrode layers of the second light-modulating film. Thus, the switch member can switch a light-transmission mode and a light-scattering mode of the second light-modulating film. The switch member for controlling the second light-modulating film may be the same as or different from the switch member for controlling the first light-modulating film.

The switch member preferably can change the voltage value to be applied between the electrode layers of the second light-modulating film. Such a configuration enables the magnitude of the visible light transmittance in a light-transmission mode by the change in magnitude of the voltage value to be applied between the electrodes by the switch member, for example, when the SPD film is used as the second light-modulating film.

The switch member may also be exteriorly disposed over the interlayer film structure, and is preferably configured by a touch sensor disposed in the interior of the interlayer film structure. Accordingly, at least any of the first and second light-modulating films is preferably controlled by the touch sensor. The detail of the touch sensor is described below.

[Internal Transparent Adhesion Layer]

The interlayer film structure of the present invention preferably comprises a transparent adhesion layer (hereinafter, also referred to as "internal transparent adhesion layer") disposed between the first light-modulating film and the second light-modulating film, in which the first and second light-modulating films are preferably bonded with the internal transparent adhesion layer being interposed therebetween. In other words, the interlayer film structure preferably comprises the first light-modulating film, the internal transparent adhesion layer, and the second light-modulating film in the listed order.

When the internal transparent adhesion layer is provided, the base material films of the first light-modulating film and the base material films of the second light-modulating film may be bonded with the internal transparent adhesion layer being interposed therebetween.

Since the base material films in the light-modulating films are relatively high in melting point, the first and second light-modulating films are difficult to directly bond by thermocompression bonding or the like, but can be easily integrated and easily incorporated into a multilayer structure of the interlayer film structure by use of the internal transparent adhesion layer. The first and second light-modulating films are preferably bonded by thermocompression bonding with the internal transparent adhesion layer being interposed therebetween, from the viewpoint of, for example, ease of production.

The internal transparent adhesion layer has transparency and has a high visible light transmittance. Accordingly, the internal transparent adhesion layer is provided, thereby not inhibiting optical characteristics such as light transmissiveness of the interlayer film structure.

The first and second light-modulating films are preferably thermocompression bonded and integrated with the internal transparent adhesion layer being interposed therebetween under a condition of 100° C. or less, and more preferably thermocompression bonded and integrated with the internal transparent adhesion layer being interposed therebetween under a condition of 100° C. or less before the two transparent panels are formed into the interlayer film structure and then the laminated panel structure.

The first and second light-modulating films can be thermocompression bonded under a condition of 100° C. or less and thus integrated without thermal degradation of the light-modulating layer. The first and second light-modulating films can also be thermocompression bonded under reduced pressure and thus integrated in the state where no air or the like is present between layers. The temperature in thermocompression bonding is, for example, 30° C. or more and 120° C. or less, and is preferably 40° C. or more and 100° C. or less.

The internal transparent adhesion layer is preferably a thermoplastic resin layer. When the internal transparent adhesion layer is a thermoplastic resin layer, the first and second light-modulating films can be easily bonded by the thermocompression bonding with the internal transparent adhesion layer being interposed therebetween.

The thermoplastic resin for use in the internal transparent adhesion layer is not particularly limited, and examples thereof include an ethylene-vinyl acetate copolymer (EVA), a polyurethane-based thermoplastic elastomer (TPU), a polyolefin-based resin (PO) such as polyethylene-based resin and a polypropylene-based resin, a cyclic olefin-based resin (COP) such as a cyclic olefin-based copolymer (COC), and a polyvinyl acetal-based resin (PVAc) such as a polyvinyl butyral-based resin (PVB). The internal transparent adhesion layer, in which such a resin is used, thus can allow the first and second light-modulating films to be bonded even by thermocompression bonding at a relatively low temperature and furthermore to be easily improved also in adhesiveness to the base material films of the light-modulating films.

In particular, a polyvinyl acetal-based resin is preferred and in particular a polyvinyl butyral-based resin is more preferred. The polyvinyl acetal-based resin is used to result in easily an improvement in adhesiveness to the light-modulating films and furthermore an enhancement in penetration resistance and the like of the laminated panel structure.

The thermoplastic resin may serve as a main component in the internal transparent adhesion layer, and the content thereof may be 50% by mass or more, preferably 70% by mass or more, further preferably 80% by mass or more based on the total amount of the internal transparent adhesion layer.

The internal transparent adhesion layer may comprise a plasticizer. The internal transparent adhesion layer, when comprises a plasticizer, is flexible to thereby allow the laminated panel structure to be enhanced in flexibility and also be enhanced in penetration resistance or the like. In addition, adhesiveness to each of the light-modulating films is also easily enhanced. Examples of the plasticizer include organic ester plasticizers such as monobasic organic acid ester and polybasic organic acid ester.

The internal transparent adhesion layer may comprise, if necessary, additive(s) other than the plasticizer, such as a filler, an infrared absorbent, an ultraviolet absorbent, an antioxidant, a light stabilizer, a fluorescent whitener, a crystal nucleating agent, a dispersant, a dye, a pigment, a carboxylic acid metal salt, and/or a heat-shielding material.

The thickness of the internal transparent adhesion layer is preferably 0.05 mm or more and 1.5 mm or less, more preferably 0.1 mm or more and 1.0 mm or less, further preferably 0.2 mm or more and 0.5 mm or less from the viewpoint that not only adhesiveness is improved, but also the interlayer film structure is prevented from being excessively thicker.

[Surface-Transparent Adhesion Layer]

A transparent adhesion layer (hereinafter, also referred to as "surface-transparent adhesion layer") is preferably further provided on an outermost surface of the interlayer film structure. The interlayer film structure can have the surface-transparent adhesion layer and thus be easily bonded to the transparent panels. The surface-transparent adhesion layer is preferably provided on both outermost surfaces of the interlayer film structure. Herein, the surface-transparent adhesion layer disposed on the outside of the first light-modulating film is referred to as "first surface-transparent adhesion layer", and the surface-transparent adhesion layer disposed on the outside of the second light-modulating film is referred to as "second surface-transparent adhesion layer".

Accordingly, the interlayer film structure preferably comprises a laminate comprising the first surface-transparent adhesion layer, the first light-modulating film, the transparent adhesion layer, the second light-modulating film and the second surface-transparent adhesion layer in the listed order.

The first light-modulating film, although is difficult to directly bond to the transparent panels by thermocompression bonding or the like as described above, comprises the first surface-transparent adhesion layer to thereby enable the interlayer film structure to be easily integrated to the transparent panels by thermocompression bonding or the like. The first and second surface-transparent adhesion layers each have transparency and a high visible light transmittance. Accordingly, the first and second surface-transparent adhesion layers do not inhibit various optical characteristics, for example, light transmittance of the interlayer film structure.

The surface-transparent adhesion layers are preferably each a thermoplastic resin layer. When the interlayer film structure comprises the first and second surface-transparent adhesion layers, both the surface-transparent adhesion layers are more preferably thermoplastic resin layers. When the surface-transparent adhesion layers are each a thermoplastic resin layer, the interlayer film structure can be easily bonded to the transparent panels by thermocompression bonding.

The thermoplastic resin for use in the surface-transparent adhesion layer(s) (namely, first or second surface-transparent adhesion layer, or both thereof) is not particularly limited, and one listed as the resin to be usable in the transparent adhesion layer can be appropriately selected and used. Such resin described above can be used to thereby bond the interlayer film structure to the transparent panels even by thermocompression bonding at a relatively low temperature. Thus, the light-modulating films can be prevented from being thermally damaged. The thermoplastic resin for use in the surface-transparent adhesion layer(s) is preferably a polyvinyl acetal-based resin, and in particular, more preferably a polyvinyl butyral-based resin. The polyvinyl acetal-based resin is used to easily result in an improvement in adhesiveness to the transparent panels, in particular, transparent panels including inorganic glass. In addition, penetration resistance and the like of the laminated panel structure are also enhanced.

Accordingly, when the laminated panel structure comprises the internal transparent adhesion layer, and the first and second surface-transparent adhesion layers, all the thermoplastic resins respectively used in the internal transparent adhesion layer, and the first and second surface-transparent adhesion layers are preferably polyvinyl acetal-based resins, and in particular, more preferably polyvinyl butyral-based resins.

The thermoplastic resin may serve as a main component in each of the surface-transparent adhesion layers, and the content thereof may be 50% by mass or more, preferably 70% by mass or more, further preferably 80% by mass or more based on the total amount of the surface-transparent adhesion layers.

The surface-transparent adhesion layer(s) (namely, first or second surface-transparent adhesion layer, or both thereof) may comprise a colorant and thus may be colored layer(s). In the case of colored layer(s), both the first and second surface-transparent adhesion layers are preferably colored layers. The surface-transparent adhesion layer(s) can be colored layer(s) and thus the visible light transmittance of the interlayer film structure can be appropriately adjusted. Thus, the degree of a sense of openness, the amount of incident heat rays, and the like can be appropriately adjusted depending on a user need. The color shades of the interlayer film structure and the laminated panel structure can be appropriately adjusted.

The colorant used is not particularly limited, color matter conventionally compounded in an interlayer film for laminated glass can be used, and color matter of blue, yellow, red, green, purple, black, white, or the like can be used. The color matter here used can be a pigment, a dye, or the like. The colorant is preferably a black pigment or a black dye, in particular, more preferably carbon black, from the viewpoint of heat insulation ability and designability.

When the surface-transparent adhesion layer(s) is/are colored layer(s), a known transparent colored film can be appropriately used. The transparent colored film here used may be, for example, one having a visible light transmittance of, for example, 70% or more, preferably about 75 to 90%. The transparent colored film here used can be a commercially available product, and, for example, a colored film of "S-LEC Film" series manufactured by Sekisui Chemical Co., Ltd. can be used.

Each of the surface-transparent adhesion layers may also comprise a plasticizer. Each of the surface-transparent adhesion layers, when comprises a plasticizer, is flexible to thereby allow the laminated panel structure to be enhanced in flexibility and also be enhanced in penetration resistance or the like. In addition, adhesiveness to the light-modulating films and the transparent panels is also easily enhanced. Examples of the plasticizer include organic ester plasticizers such as monobasic organic acid ester and polybasic organic acid ester.

Each of the surface-transparent adhesion layers may comprise, if necessary, additive(s) other than the plasticizer and the colorant, such as a filler, an infrared absorbent, an ultraviolet absorbent, an antioxidant, a light stabilizer, a fluorescent whitener, a crystal nucleating agent, a dispersant, a carboxylic acid metal salt, and/or a heat-shielding material.

The thickness of each of the surface-transparent adhesion layers is preferably 0.05 mm or more and 1.5 mm or less, more preferably 0.1 mm or more and 1.0 mm or less, further preferably 0.2 mm or more and 0.5 mm or less from the viewpoint that not only adhesiveness is improved, but also the interlayer film structure is prevented from being excessively thicker.

<Laminated Panel Structure>

The laminated panel structure of the present invention comprises the above-mentioned interlayer film structure for a laminated panel and two transparent panels, and the interlayer film structure for a laminated panel is disposed with being sandwiched between the two transparent panels. In the laminated panel structure, the two transparent panels are bonded with the interlayer film structure for a laminated panel being interposed therebetween.

Examples of such a transparent panel include a glass plate. The glass plate may be any of inorganic glass and organic glass, and is preferably inorganic glass. The inorganic glass is not particularly limited, and examples thereof include clear glass, clear float glass, float plate glass, reinforced glass, colored glass, polished plate glass, figured glass, wire-net plate glass, wired plate glass, ultraviolet absorption plate glass, infrared reflection plate glass, infrared absorption plate glass, and green glass.

One generally called resin glass is used as the organic glass, and examples thereof include organic glass configured from a polycarbonate plate, a polymethyl methacrylate plate, a polyester plate or the like, but are not limited thereto.

The two transparent panels may be constituted from the same materials as each other or different materials from each other. For example, one may be inorganic glass and another may be organic glass, both the two transparent panels are preferably each inorganic glass or organic glass, and both are more preferably each inorganic glass.

The thickness of each of the transparent panels is not particularly limited, and is preferably 0.5 mm or more and 3.2 mm or less, more preferably 0.7 mm or more and 2.7 mm or less, further preferably 1.0 mm or more and 2.6 mm or less. The thickness can fall within the above range to thereby not only impart certain mechanical strength to the laminated panel structure, but also allow the thickness of the entire laminated panel structure to be equal to or less than a certain thickness.

The laminated panel structure of the present invention preferably has a thickness of 7 mm or less. The laminated panel structure, which has a thickness of 7 mm or less, thus can be suitably used in window glass for cars, in particular, roof glass for cars. The lower limit value of the thickness of the laminated panel structure is not particularly limited, and is, for example, 4 mm or more, preferably 5 mm or more.

[Layer Configuration]

Next, the interlayer film structure, and a laminated structure of the laminated panel structure comprising the interlayer film structure are described in detail with reference to the drawings. FIGS. 1 to 8 each illustrate a laminated panel structure comprising an interlayer film structure according to each embodiment of the present invention.

As illustrated in FIG. 1, a laminated panel structure 10 comprises an interlayer film structure 11, and two transparent panels 12 and 13. The interlayer film structure 11 is disposed with being sandwiched between the two transparent panels 12 and 13, and the two transparent panels 12 and 13 are bonded with the interlayer film structure 11 being interposed therebetween.

In a preferable embodiment of the present invention, the interlayer film structure 11 comprises a first surface-transparent adhesion layer 31, a first light-modulating film 21, an internal transparent adhesion layer 30, a second light-modulating film 22, and a second surface-transparent adhesion layer 32 in the listed order, as illustrated in FIG. 1. The interlayer film structure is bonded to the transparent panels 12 and 13 respectively by the first surface-transparent adhesion layer 31 and the second surface-transparent adhesion layer 32.

The second light-modulating film 22 is here preferably disposed closer to the outdoor side than the first light-modulating film 21, as described above. In other words, the transparent panel 13 may be disposed on the outdoor side and the transparent panel 12 may be disposed on the indoor side. The same also applies to each embodiment described below.

Herein, the first light-modulating film 21 may also be disposed closer to the outdoor side than the second light-modulating film 22.

While peripheral edges 21A and 22A of the respective light-modulating films 21 and 22 are disposed at locations corresponding to peripheral edges 12A and 13A of the two transparent panels 12 and 13 in plan view in the thickness direction in the interlayer film structure 11 illustrated in FIG. 1, these are not needed to be correspondingly disposed. Specifically, as indicated in embodiments illustrated in FIGS. 2 and 3, the peripheral edges 21A and 22A of the light-modulating films 21 and 22 may be disposed on the inner circumferential side with respect to the peripheral edges 12A and 13A of the transparent panels 12 and 13. In this case, the respective peripheral edges 21A and 22A of the light-modulating films 21 and 22 are preferably disposed on the inner circumferential side at a distance L of 10 mm or more from the peripheral edges 12A and 13A of the two panels 12 and 13.

The respective peripheral edges 21A and 22A may be partially disposed on the inner circumferential side with respect to both the peripheral edges 12A and 13A, and the respective peripheral edges 21A and 22B are preferably disposed on the inner circumferential side with respect to both the peripheral edges 12A and 13A throughout the circumference, more preferably disposed on the inner circumferential side at a distance L of 10 mm or more from both the peripheral edges 12A and 13A throughout the circumference.

The respective distances L between the peripheral edges 21A and 22A and the peripheral edges 12A and 13A may be 10 mm or more, as described above, and the upper limits thereof are not particularly limited, and may be each, for example, 150 mm or less.

While the peripheral edges 12A and 13A of the transparent panels 12 and 13 are usually disposed at locations corresponding to each other in plan view in the thickness direction, these may be deviated from each other. Similarly, while the peripheral edges 21A and 22B of the light-modulating films 21 and 22 are usually disposed at locations corresponding to each other in plan view in the thickness direction, these may be deviated from each other. Thus, when these are deviated from each other, the distance between the peripheral edges of a transparent panel and a light-modulating film that are the closest to each other may be defined as the distance L, and the distance L is more preferably in the above range throughout the circumference as described above.

Figure 2:
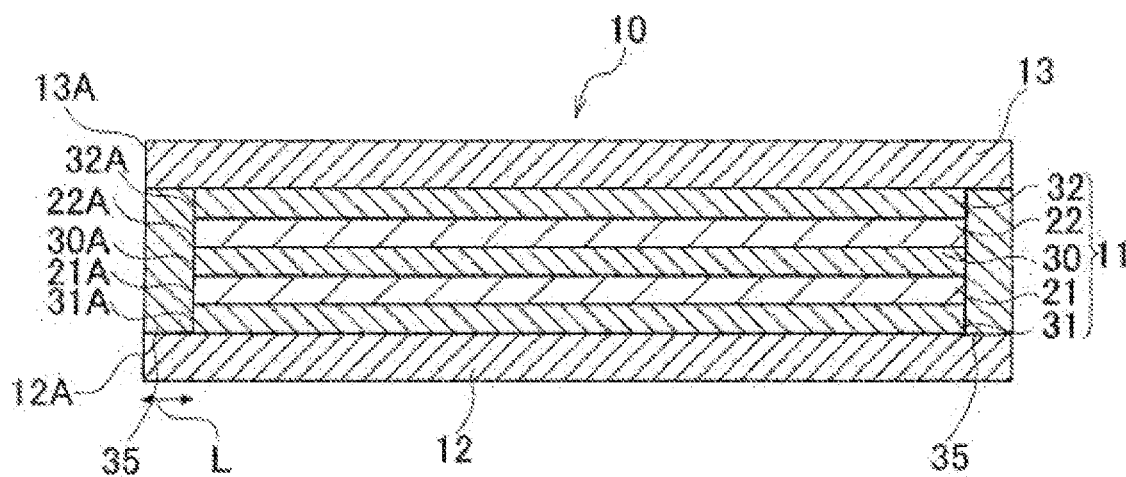
FIG. 2 is a schematic cross-sectional view illustrating a laminated panel structure according to one embodiment of the present invention.
Figure 3:
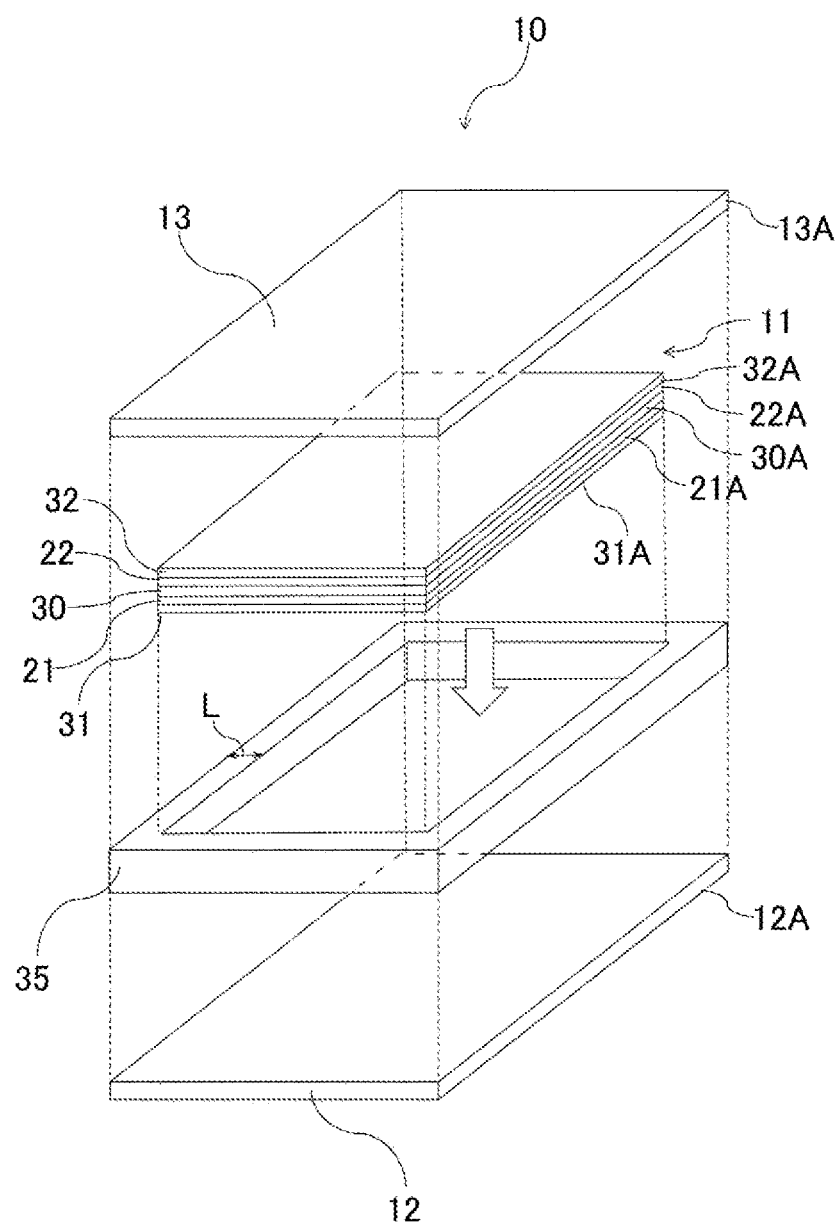
FIG. 3 is an exploded perspective view illustrating the laminated panel structure illustrated in FIG. 2.

As illustrated in FIGS. 2 and 3, when the peripheral edges 21A and 22A of the light-modulating films 21 and 22 are disposed on the inner circumferential side with respect to the peripheral edges 12A and 13A of the transparent panels 12 and 13, the interfilm structure 10 preferably comprises a sealing material 35 disposed on the outer circumferential side with respect to the first and second light-modulating films 21 and 22. If the peripheral edges 21A and 22A of the light-modulating films 21 and 22 are disposed on the inner circumferential side, any pore occurs on the outer circumferential side with respect to the light-modulating films 21 and 22 due to such disposing on the inner circumferential side and such any pore can be embedded by disposing the sealing material 35.

The sealing material 35 may be disposed on the outer circumferential side with respect to the light-modulating films 21 and 22, and is preferably disposed throughout the outer circumferential side with respect to the light-modulating films 21 and 22, as illustrated in FIG. 3. Accordingly, as illustrated in FIG. 3, the sealing material 35 is preferably formed into a frame in plan view in the thickness direction. The sealing material 35 is consequently disposed between the transparent panels 21 and 22. The width of such a frame-shaped sealing material 35 may be the same as the distance L.

In the embodiment illustrated in FIG. 2, not only the peripheral edges 21A and 22A of the light-modulating films 21 and 22, but also the peripheral edges 30A, 31A, and 32A of the transparent adhesion layers 30, 31, and 32 may be disposed on the inner circumferential side with respect to the peripheral edges 12A and 13A of the transparent panels 12 and 13, in the interlayer film structure 11. The interlayer film structure 11 has such a structure to thereby impart a structure where the sealing material 35 is disposed on the outer circumferential side with respect to not only the light-modulating films 21 and 22, but also the adhesion layers 30, 31, and 32. The thickness of the sealing material 35 is then the same as the thickness of the interlayer film structure 11, and both surfaces of the sealing material 35 in the thickness direction may be bonded to the transparent panels 12 and 13. Thus, the sealing material 35 easily ensures high sealability, in the embodiment in FIG. 3.

The sealing material 35 may be bonded to and integrated with the respective peripheral edges 30A, 31A, and 32A of the transparent adhesion layers 31, and 32. The sealing material 35 is bonded to each of the adhesion layers 31, and 32 and thus a structure is made where the first and second light-modulating films 21 and 22 are sealed by an integrated product of the adhesion layers 30, 31, and 32, and the sealing material 35. Thus, penetration of water, oxygen, and the like from outside is prevented in the first and second light-modulating films 21 and 22, and durability is increased. The sealing material may be appropriately bonded to the peripheral edges 21A and 22A of the light-modulating films 21 and 22.

Figure 4:
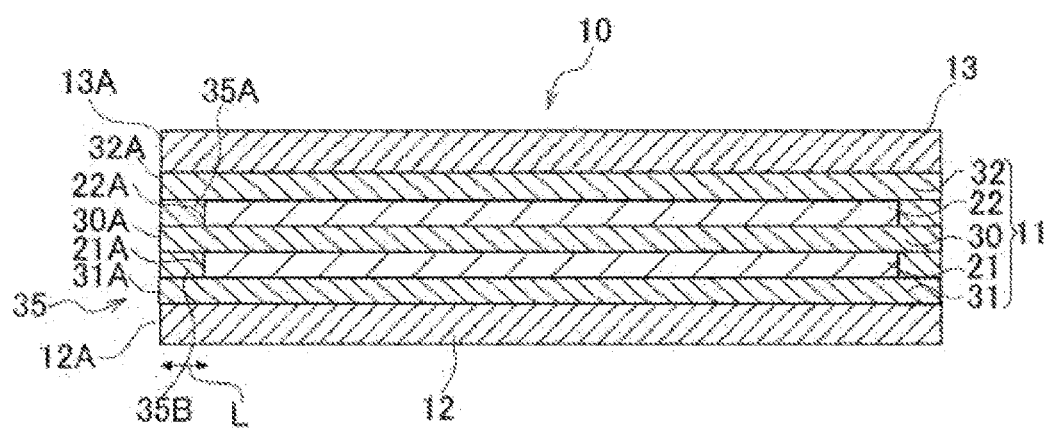
FIG. 4 is a schematic cross-sectional view illustrating a laminated panel structure according to one embodiment of the present invention.

Herein, as illustrated in FIG. 4, a configuration may be made where not only the sealing material 35 is disposed only on the outside with respect to the light-modulating films 21 and 22, but also the peripheral edges 30A, 31A, and 32A of the respective transparent adhesion layers 30, 31, and 32 are disposed on the outside with respect to the peripheral edges 21A and 21B of the light-modulating films 21 and 22. In this case, two of the sealing materials 35 are provided as first and second sealing materials 35A and 35B on the respective outsides of the light-modulating films 21 and 22. Thus, a laminated structure of the first surface-transparent adhesion layer 31, the first sealing material 35A, the internal transparent adhesion layer 30, the second sealing material 35B, and the second surface-transparent adhesion layer 32 is obtained in a region on the outer circumferential side with respect to the light-modulating films 21 and 22.

Figure 5:
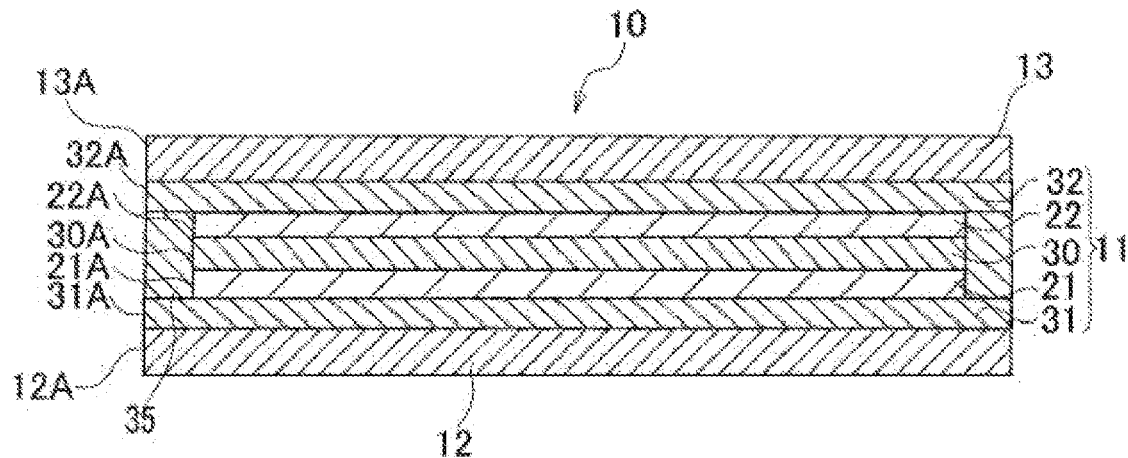
FIG. 5 is a schematic cross-sectional view illustrating a laminated panel structure according to one embodiment of the present invention.

As illustrated in FIG. 5, a configuration may also be made where not only the sealing material 35 is disposed on the outer circumferential side with respect to the light-modulating films 21 and 22 and the internal transparent adhesion layer 30 located therebetween, but also the peripheral edges 31A and 32A of the surface-transparent adhesion layers 31 and 32 are disposed on the outer circumferential side with respect to the peripheral edges 21A and 21B of the light-modulating films 21 and 22. According to such a configuration, a laminated structure of the first surface-transparent adhesion layer 31, the sealing material 35, and the second surface-transparent adhesion layer 32 is obtained in a region on the outer circumferential side with respect to the light-modulating films 21 and 22. The sealing material 35 may have the same thickness as the total thickness of the light-modulating films 21 and 22 and the transparent adhesion layer 30, and both surfaces of the sealing material 35 in the thickness direction may be bonded to the surface-transparent adhesion layers 31 and 32.

When the sealing material 35 is provided as in the embodiments illustrated in FIGS. 2, 4, and 5, extraction electrodes (not illustrated) of the respective light-modulating films 21 and 22 may extend exteriorly with passing between the sealing material 35 and the transparent panel 21 or the transparent panel 22, for example, in the configuration in FIG. 2, and may extend exteriorly with passing, for example, between the sealing material 35 and the adhesion layer in the configurations in FIGS. 4 and 5.

(Sealing Material)

The sealing material is preferably constituted by a resin, and is preferably constituted by a thermoplastic resin. When the sealing material is constituted by a thermoplastic resin, the sealing material is easily bonded to the transparent panels and/or other transparent adhesion layer by thermocompression bonding.

One listed as the thermoplastic resin to be usable in the transparent adhesion layer can be appropriately selected and used as the thermoplastic resin for use in the sealing material. The resin can be used to thereby bond the sealing material to the transparent panels and/or other transparent adhesion layer even by thermocompression bonding at a relatively low temperature, and prevent the light-modulating films from being damaged in thermocompression bonding. The thermoplastic resin for use in the sealing material is preferably a polyvinyl acetal-based resin, and in particular, more preferably a polyvinyl butyral-based resin. The polyvinyl acetal-based resin is used and thus adhesiveness to the transparent panels, in particular, transparent panels including inorganic glass is excellent. In addition, adhesiveness to the transparent adhesion layer, the light-modulating film, and the like is also excellent.

The same kind of resin as those in the transparent adhesion layers provided in the interlayer film structure is preferably used in the sealing material from the viewpoint of adhesiveness to other transparent adhesion layer.

Accordingly, when the interlayer film structure comprises, in addition to the sealing material, the first and second surface-transparent adhesion layers and the internal transparent adhesion layer, all the thermoplastic resins respectively used in the sealing material, the first and second surface-transparent adhesion layer, and the internal transparent adhesion layer are preferably polyvinyl acetal-based resins, and all are more preferably polyvinyl butyral-based resins.

The thermoplastic resin may serve as a main component in the sealing material, and the content thereof may be 50% by mass or more, preferably 70% by mass or more, further preferably 80% by mass or more on the total amount of the sealing material.

The sealing material may comprise a plasticizer. The sealing material, when comprises a plasticizer, is flexible to thereby allow for an enhancement in adhesiveness to not only the transparent panel, but also other transparent adhesion layer. Examples of the plasticizer include organic ester plasticizers such as monobasic organic acid ester and polybasic organic acid ester.

The sealing material may comprise, if necessary, additive(s) other than the plasticizer, such as a filler, an infrared absorbent, an ultraviolet absorbent, an antioxidant, a light stabilizer, a fluorescent whitener, a crystal nucleating agent, a dispersant, a dye, a pigment, a carboxylic acid metal salt, and/or a heat-shielding material.

Figure 6:
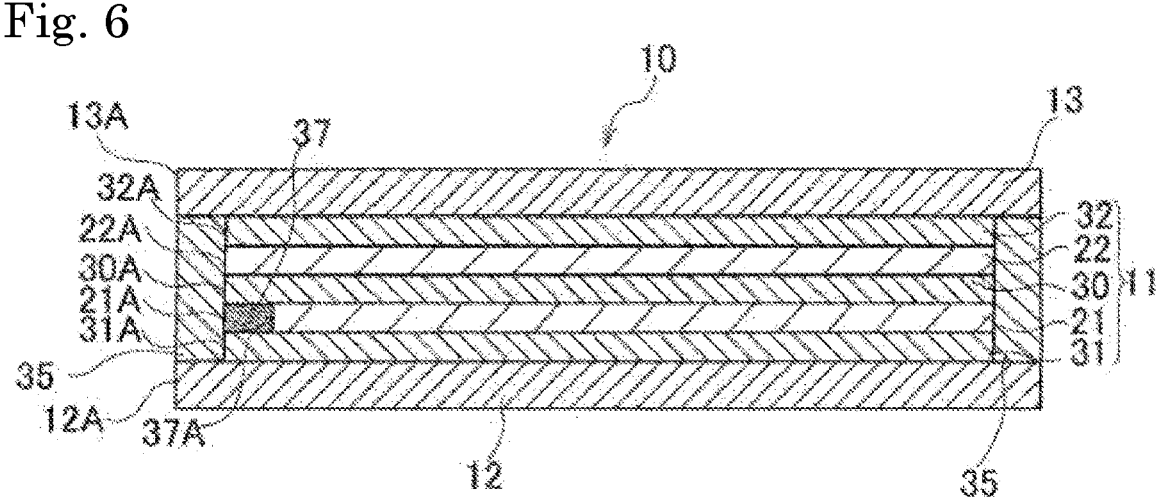
FIG. 6 is a schematic cross-sectional view illustrating a laminated panel structure according to one embodiment of the present invention.

As indicated in the embodiment in FIG. 6, it is also preferable to provide a touch sensor 37 in the interior of the interlayer film structure 11. The touch sensor 37 may be disposed in, for example, a space 37A that is provided in the interior of the interlayer film structure 11.

The space 37A may be provided with a cutout on one portion of the first light-modulating film 21 and the touch sensor 37 may be provided on the cutout portion (space 37A), for example, as illustrated in FIG. 6.

Herein, the space 37A on which the touch sensor 37 is to be provided is not limited to the cutout on the first light-modulating film 21, and may be configured by a cutout, a hollow section, or the like provided on at least any of the first and second light-modulating films 21 and 22, the adhesive layers 30, 31, and 32, and the sealing material 35.

The touch sensor 37 comprises at least a conductive layer, and provides touch input by approaching or contacting of a finger, a stylus pen, or other article to or with any of the transparent panels and thus generation of an electric change of an electrostatic capacitance, a current, a voltage, and/or the like. Herein, the touch input does not need precise contacting of a finger, a stylus pen, or other article with the laminated panel structure, and generation of an electric change on the conductive layer by approaching of a finger or the like is also broadly meant as the touch input. Herein, the system of the touch sensor is not particularly limited, and examples thereof include an electrostatic capacitance system and a resistance film system.

An extraction electrode not illustrated is connected to the touch sensor 37, and the extraction electrode may be drawn exteriorly with passing between layers constituting the interlayer film structure, between the sealing material and the transparent panels, or the like.

Figure 7:
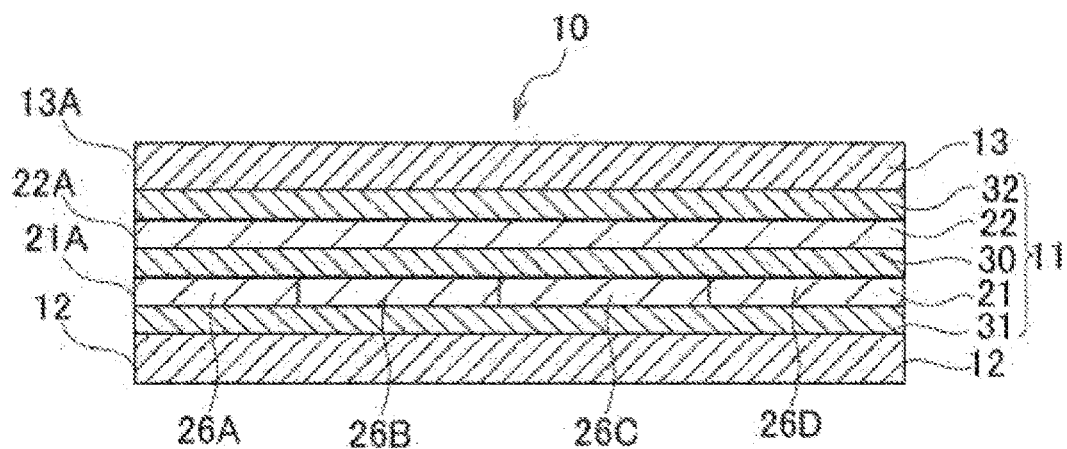
FIG. 7 is a schematic cross-sectional view illustrating a laminated panel structure according to one embodiment of the present invention.

FIG. 7 illustrates a laminated panel structure comprising an interlayer film structure according to another embodiment. In the embodiment illustrated in FIG. 7, the first light-modulating film 21 is divided to a plurality of independently controllable segments (segments 26A, 26B, 26C, and 26D in FIG. 7), and the segments 26A to 26D can each separately switch between light transmission and light scattering. For example, in the first light-modulating film 21, the conductive layer is divided to a plurality of such layers with corresponding to the respective segments 26A to 26D, application and no application of a voltage can be switched with respect to each of the segments, and thus a light-transmission mode and a light-scattering mode can be independently switched with respect to each of the segments.

According to such a configuration, partial shading can be made in the laminated panel structure in the present embodiment, and thus usability can be increased.

While the first light-modulating film is divided to the segments in an aspect where no sealing material 35 is provided in the embodiment illustrated in FIG. 7, the first light-modulating film may be divided to a plurality of segments in an aspect where the sealing material 35 is provided as illustrated in FIGS. 2 to 5.

While the touch sensor 37 is provided in an aspect where the sealing material 35 is provided in the embodiment illustrated in FIG. 6, a touch sensor may also be provided, for example, in an aspect illustrated in FIG. 1 where no sealing material 35 is provided. An aspect with respect to the sealing material 35, in which a touch sensor is provided, is not limited to the aspect illustrated in FIG. 6 and may be any aspect.

While each of the foregoing embodiments illustrated with reference to FIGS. 1 to 7 relates to a structure where the interlayer film structure comprises the first and second light-modulating films 21 and 22 and the transparent adhesion layers 30, 31, and 32, one or more of the transparent adhesion layers 30, 31, and 32 may be appropriately omitted.

Figure 8:
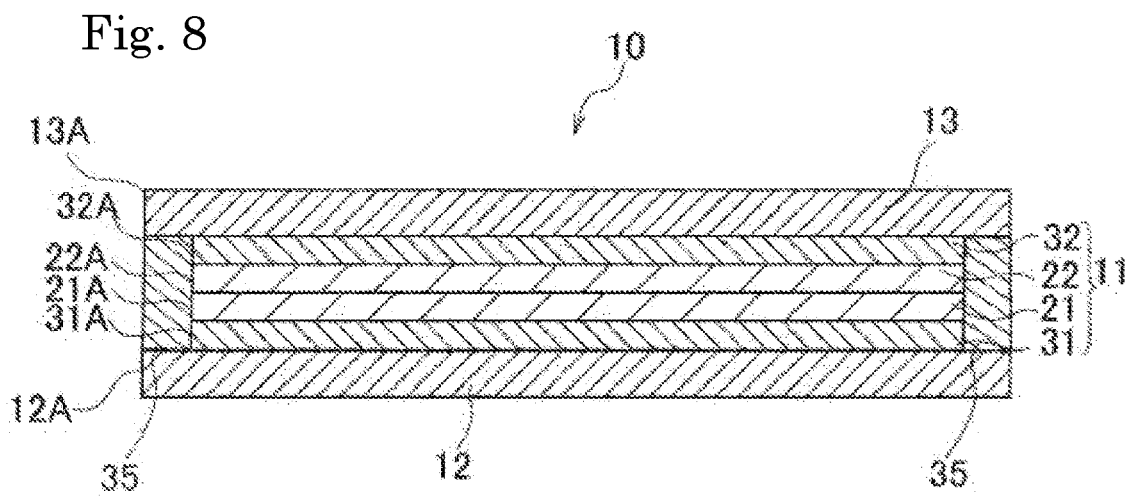
FIG. 8 is a schematic cross-sectional view illustrating a laminated panel structure according to one embodiment of the present invention.

FIG. 8 illustrates an embodiment where the transparent adhesion layer 30 is omitted. As illustrated in FIG. 8, the first and second light-modulating films 21 and 22 may be directly laminated in a configuration where the transparent adhesion layer 30 is omitted. Here, the base material films of the light-modulating films 21 and 22 may or may not be bonded to each other by thermocompression bonding or the like.

The sealing material 35 may be provided on the outer circumferential side with respect to the first and second light-modulating films 21 and 22, and the sealing material 35 may be bonded to and integrated with the surface-transparent adhesion layers 31 and 32. The surface-transparent adhesion layers 31 and 32 and the sealing material 35 that are integrated may support the first and second light-modulating films 21 and 22 that are disposed so as to be buried in the interior of these layers and material.

One of or both the surface-transparent adhesion layers 31 and 32 may be omitted instead of the internal transparent adhesion layer 30, in the interlayer film structure, and in this case, for example, the base material films of the first and second light-modulating films 21 and 22 may be directly bonded to the transparent panels 12 and 13 by thermocompression bonding or the like. All the transparent adhesion layers 30, 31, and 32 may be omitted.

The laminated panel structure may comprise three or more light-modulating films, and, for example, may comprise two or more of the first light-modulating films or may comprise two or more of the second light-modulating films. The three or more light-modulating films may be arranged along with the thickness direction.

The light-modulating films may be three or more light-modulating films that are different in type from one another and are arranged in the thickness direction.

[Optical Characteristics of First Light-Modulating Film in Light-Transmission Mode]
(Visible Light Transmittance)

The interlayer film structure of the present invention is preferably such that the visible light transmittance measured in the first light-modulating film in a light-transmission mode, in a laminated panel structure produced with the interlayer film structure under predetermined conditions, is adjustable to 1% or less by the second light-modulating film. The visible light transmittance is preferably adjustable to 0.1% or more and 1% or less, more preferably adjustable to 0.2% or more and 1% or less. Here, the second light-modulating film may be in a light-shielding mode to thereby adjust the visible light transmittance within the above range.

If the visible light transmittance is adjustable to 1% or less as described above, heat rays are sufficiently shielded in the interlayer film structure, and the car interior is prevented from getting warm due to irradiation with sunlight in the case of use in, for example, window glass for cars, particularly roof glass therefor. If the visible light transmittance is adjusted to 0.1% or more, certain light transmits to thereby prevent complete shading by the interlayer film structure and also impart a certain sense of openness.

The laminated panel structure produced under predetermined conditions means a laminated panel structure obtained by bonding two sheets of clear glass having a thickness of 2.5 mm (visible light transmittance: 90.4%) with the interlayer film structure for a laminated panel being interposed therebetween. The same also applies to the following.

The interlayer film structure of the present invention is preferably such that the visible in a light-transmission mode to thereby adjust the visible light transmittance within the above range.

When the first light-modulating film is in a light-transmission mode and the visible light transmittance can be adjustable to 10% or more by the second light-modulating film, the exterior can be easily viewed via the laminated panel structure. In addition, much outside light can be taken to the interior via the laminated panel structure, thus outside light can be taken in a certain amount or more even in the case of bad weather or night, and a sense of openness is obtained even in such an environment.

If the visible light transmittance is adjustable to not only 1% or less, but also 10% or more, by the second light-modulating film, as described above, the visible light transmittance of the interlayer film structure can be highly changed in the case where the first light-modulating film is in a light-transmission mode. Thus, outside light can be much taken or transmission of outside light can be suppressed depending on the exterior state (for example, weather, and time of day), and a sense of openness is easily obtained without depending on the exterior state.

(Tds)

The interlayer film structure of the present invention is preferably such that the Tds (Solar direct transmittance) measured in the first light-modulating film in a light-transmission mode, in a laminated panel structure produced with the interlayer film structure under predetermined conditions, is adjustable to 55% or less. If the Tds measured in the first light-modulating film in a light-transmission mode is adjustable to 55% or less, the interlayer film structure can ensure heat insulation ability at a certain level or more and can effectively prevent the entry of heat rays, even if the first light-modulating film is in a light-transmission mode.

The Tds is preferably adjustable to 55% or less as described above even when the second light-modulating film is in a light-transmission mode, in order that heat insulation ability at a certain level or more is ensured, and is more preferably adjustable to 50% or less when the second light-modulating film is in a light-transmission mode. When the first light-modulating film is in a light-transmission mode and the second light-modulating film is in a light-transmission mode, the Tds may be adjusted to, for example, 30% or more from the viewpoint that certain light transmissiveness is ensured.

The Tds in the case of the first light-modulating film in a light-transmission mode and the second light-modulating film in a light-shielding mode is more preferably lower from the viewpoint that, for example, heat insulation ability is sufficiently ensured even under clear weather, and is, for example, less than 30%, preferably 20% or less, more preferably 15% or less, and practically, for example, 1% or more, and may be 10% or more.

(Haze Value)

The interlayer film structure of the present invention is preferably such that the haze value measured in the first light-modulating film in a light-transmission mode, in a laminated panel structure produced with the interlayer film structure under predetermined conditions, is adjustable to 40% or less. If the haze value is adjustable to 40% or less, light scattering in the case of the first light-modulating film in a light-transmission mode is prevented and a sense of openness is easily obtained. The haze value in the case of the second light-modulating film in a light-transmission mode may be 40% or less, and is more preferably adjustable to 40% or less in both the cases of the second light-modulating film in a light-transmission mode and that in a light-shielding mode in order that a sufficient sense of openness is obtained.

The haze value in the case of the first light-modulating film in a light-transmission mode and the second light-modulating film in a light-transmission mode is more preferably lower in order that a certain sense of openness is obtained even under bad weather or night, and is preferably 20% or less, more preferably 15% or less, further preferably 10% or less. The haze value may be 0% or more, and is practically, for example, 1% or more.

[Optical Characteristics in Case of First Light-Modulating Film in Light-Scattering Mode]
(Visible Light Transmittance and Haze Value)

The interlayer film structure of the present invention is preferably such that the haze value and the visible light transmittance measured in the first light-modulating film in a light-scattering mode, in a laminated panel structure produced with the interlayer film structure under predetermined conditions, are adjustable respectively to 70% or more and 20% or less. The haze value is more preferably 80% or more, further preferably 90% or more, and the visible light transmittance is more preferably 10% or less, further preferably 5% or less, still further preferably 1% or less. In the present invention, if the visible light transmittance is low and furthermore the haze value is high in the case of the first light-modulating film in a light-scattering mode, the laminated panel structure is sufficiently shaded by the first light-modulating film in a light-scattering mode.

In the interlayer film structure, the visible light transmittance and the haze value may be adjustable within the above ranges in the case of the second light-modulating film at least in a light-shielding mode, and the visible light transmittance and the haze value are preferably adjustable within the above ranges in both the cases of the second light-modulating film in a light-transmission mode and that in a light-shielding mode.

(Tds)

The interlayer film structure of the present invention is preferably such that the Tds measured in the first light-modulating film in a light-scattering mode, in a laminated panel structure produced with the interlayer film structure under predetermined conditions, can be lower than the Tds in the case of the first light-modulating film in a light-transmission mode and the second light-modulating film in a light-shielding mode. The Tds is preferably less than 10%, more preferably less than 6%. The Tds may be adjustable within the above range in both the cases of the second light-modulating film in a light-transmission mode and that in a light-shielding mode, and the Tds can be lower and is preferably adjustable to less than 4%, further preferably less than 3% in the case of the second light-modulating film in a light-shielding mode. Thus, in the present invention, the Tds value can be extremely low and heat shielding can also be made at a comparable level with that of mechanical shade.

The visible light transmittance, the Tds, and the haze value may be measured by allowing a ray bundle to be incident to a surface disposed toward the outdoor. Accordingly, in the case of the laminated panel structure 10, such measurement may be made by allowing a ray bundle to be incident from the transparent panel 13 side (namely, the second light-modulating film 22 side).

[Method of Use]

The interlayer film structure and the laminated panel structure of the present invention can be used in window glass for various vehicles such as cars, airplanes, marine vessels, buildings, and the like, and are preferably used for buildings and cars.

In a car, the car interior may get warm due to the entry of heat rays from the car exterior via window glass. Similarly, in a building, the building interior may get warm due to the entry of heat rays into the building via window glass, and the interlayer film structure of the present invention can block light by appropriate combination of the modes of the light-modulating films to thereby appropriately prevent the entry of heat rays into a car or a building.

The interlayer film structure and the laminated panel structure of the present invention are preferably used particularly for cars. In the case of use for cars, these structures may be used in any window glass such as side glass, rear glass, and roof glass, and are preferably used in roof glass. While roof glass is irradiated with sunlight from above and thus irradiated with a large amount of heat rays, the present invention allows the entry of heat rays to be effectively prevented by the interlayer film structure. Furthermore, the interlayer film structure and the laminated panel structure of the present invention are used in roof glass to thereby easily provide a much more sense of openness.

The roof glass herein may be at least partially disposed on the roof, and, for example, glass disposed across the roof and the rear is also referred to as "roof glass". The roof of a car is a portion constituting the top surface of the body, and roof glass is generally disposed in a horizontal direction, or with being slightly inclined (for example, within 20°) in a horizontal direction. The inclination is an inclination relative to the horizontal direction of a line joining ends of glass disposed at the roof position.

The roof glass preferably has an area of 1 $m^2$ or more, more preferably 1.5 $m^2$ or more.

The interlayer film structure and the laminated panel structure of the present invention may be used with appropriate switching between a light-transmission mode and a light-scattering mode of the first light-modulating film and appropriate adjustment of the visible light transmittance of the second light-modulating film. The second light-modulating film can switch between a light-transmission mode and a light-shielding mode as described above, and furthermore the second light-modulating film, when is, for example, an SPD film, can also adjust the magnitude of the visible light transmittance by adjustment of the voltage value in a light-transmission mode.

For example, when light from the exterior is to be completely shielded, the first light-modulating film may be in a light-scattering mode and the second light-modulating film may be in a light-shielding mode. Such mode selection, although makes it difficult to view the exterior with the laminated panel structure being interposed, results in a reduction in Tds and sufficient shielding of heat rays. Accordingly, for example, in an aspect of application to roof glass, when no roof glass is needed, sufficient heat insulation ability can be obtained by shading by the first and second light-modulating films, and the car interior can be prevented from getting warm due to sunlight.

On the other hand, when the exterior is to be viewed via the laminated panel structure or a sense of openness is to be obtained, the first light-modulating film may be in a light-transmission mode. The second light-modulating film may be here in a light-shielding mode or in a light-transmission mode depending on the exterior state. When the first light-modulating film is in a light-transmission mode and the second light-modulating film is in a light-shielding mode, the laminated panel structure not only has certain heat insulation ability, but also achieves certain light transmissiveness. On the other hand, when the second light-modulating film is in a light-transmission mode, high light transmissiveness can be obtained and high visibility can be ensured.

Accordingly, in an aspect of application to roof glass, not only the car interior can be inhibited from getting warm due to sunlight at a certain level depending on the exterior state, but also a sense of openness can be obtained and exterior observation can be made possible by high visibility.

Furthermore, when, for example, an SPD film is used as the second light-modulating film, the voltage value to be applied in a light-transmission mode can be adjusted to also adjust the visible light transmittance, and thus light transmissiveness can also be finely adjusted depending on the exterior state.

[Method for Producing Interlayer Film Structure and Laminated Panel Structure]

In the present invention, in production of the interlayer film structure, first, the first and second light-modulating films, and, if necessary, a resin film for the adhesion layers, for transparent adhesion layer formation, are prepared. When the sealing material is needed, for example, a resin film for the sealing material, processed into a shape of a frame or the like, is prepared.

The first and second light-modulating films and the resin film for the adhesion layers are appropriately superimposed and furthermore the resin film for the sealing material is, if necessary, disposed on the outer circumferential side with respect to the light-modulating films, and these are pressurized and thermocompression bonded in the thickness direction and thus the interlayer film structure can be produced. The temperature in thermocompression bonding is, for example, 30° C. or more and 120° C. or less, as described above, and is preferably 40° C. or more and 100° C. or less. The pressure in thermocompression bonding is not particularly limited, thermocompression bonding may be made at a negative pressure, and, for example, a pressure of about −780 mbar, in terms of gauge pressure, may be adopted.

Next, the resulting interlayer film structure and two transparent panels may be used to produce the laminated panel structure. Specifically, a common method for producing laminated glass may be performed without particular limitation, and the laminated panel structure can be obtained, for example, by disposing the interlayer film structure between two transparent panels, and compression bonding the resultant by an autoclave or the like at a temperature of, for example, about 30° C. or more and 120° C. or less, preferably about 40° C. or more and 100° C. or less.

In the present invention, the laminated panel structure may also be produced while the interlayer film structure is formed. Specifically, the first and second light-modulating films and the resin film for the adhesion layers are appropriately superimposed and furthermore the resin film for the sealing material is, if necessary, disposed on the outer circumferential side with respect to the light-modulating films, and these may be pressurized and thermocompression bonded in the thickness direction in the state of being disposed between two transparent panels. Thus, an outermost surface of the interlayer film structure is bonded to each of the transparent panels while the interlayer film structure is formed, and therefore the interlayer film structure and the laminated panel structure can be collectively produced. The temperature in thermocompression bonding is, for example, 30° C. or more and 120° C. or less, and is preferably 40° C. or more and 100° C. or less. The pressure in thermocompression bonding is not particularly limited, thermocompression bonding may be made at a negative pressure, and, for example, a pressure of about −780 mbar, in terms of gauge pressure, may be adopted. When the laminated panel structure is obtained by thermocompression bonding, temporary bonding may also be made under the above conditions before thermocompression bonding.

EXAMPLES

The present invention is further specifically described with reference to Examples, but the present invention is not limited by these Examples at all.

The methods for measuring the haze value, the visible light transmittance, and the Tds of each of the light-modulating film, the laminated panel structure, and the like are as follows.

[Visible Light Transmittance (Tv)]

Measurement was made with a spectrophotometer ("U-4100" manufactured by Hitachi High-Tech Corporation), according to JIS R3106:2019.

[Tds]

The Tds at a wavelength of 300 to 2500 nm was measured with a spectrophotometer ("U-4100" manufactured by Hitachi High-Tech Corporation), according to ISO 13837.

[Haze Value (Haze)]

Measurement was made with a haze meter ("TC-HII-IDPK" manufactured by Tokyo Denshoku Co., Ltd.), according to JIS K6714.

Example 1

First, the following respective materials were prepared. The thickness of each layer is as described in Table 1.

Transparent panel: clear glass plate having a visible light transmittance according to JIS R 3202:2011, of 90.4%

First light-modulating film: polymer dispersion type liquid crystal film manufactured by Gauzy Ltd., light-scattering mode at voltage OFF, light-transmission mode at voltage ON (70 V)

Second light-modulating film: SPD film manufactured by Gauzy Ltd., light-shielding mode at voltage OFF, light-transmission mode at voltage ON (70 V)

First and second surface-transparent adhesion layers and internal transparent adhesion layer: resin film (1) including plasticizer-containing polyvinyl butyral-based resin, thickness 0.38 mm The resin film (1), the first light-modulating film, the resin film (1), the second light-modulating film, and the resin film (1) were superimposed in the listed order, thermocompression bonded at 70° C. and −780 mbar (gauge pressure) and thus integrated, to thereby obtain an interlayer film structure. Next, the resulting interlayer film structure and a transparent panel were superimposed on another transparent panel, and these were integrated under conditions of and 3 bar (gauge pressure) by use of an autoclave, to thereby obtain a laminated panel structure. The laminated panel structure had a laminated structure as illustrated in FIG. 1, in which the two transparent panels were bonded with the interlayer film structure being interposed therebetween.

Example 2

The same materials as in Example 1 were prepared except that the following resin film (2) was prepared for a resin film for first and second surface-transparent adhesion layers.

First and second surface-transparent adhesion layers: "S-LEC Film No. 7082" (colored film) manufactured by Sekisui Chemical Co., Ltd., thickness 0.38 mm The resin film (2), the first light-modulating film, the resin film (1), the second light-modulating film, and the resin film (2) were superimposed in the listed order, and thermocompression bonded under the same conditions as in Example 1, and thus these were integrated, to thereby obtain an interlayer film structure. Thereafter, a laminated panel structure was produced in the same manner as in Example 1. The laminated panel structure had a laminated structure as illustrated in FIG. 1, in which the two transparent panels were bonded with the interlayer film structure being interposed therebetween.

Comparative Example 1

The following resin film (3) was prepared as a resin film for a transparent adhesion layer, in addition to the resin film (1) having a thickness of 0.76 mm. The same first light-modulating film and transparent panels as in Example 1 were prepared.

Transparent adhesion layer (resin film (3)): "S-LEC Film No. 7018" (colored film) manufactured by Sekisui Chemical Co., Ltd., thickness 0.76 mm The resin film (1), the first light-modulating film, and the resin film (3) were superimposed in the listed order, and thermocompression bonded under the same conditions as in Example 1 and thus these were integrated, to thereby obtain an interlayer film structure, and thereafter a laminated panel structure was obtained in the same manner as in Example 1. The laminated panel structure had a laminated structure of transparent panel/transparent adhesion layer/first light-modulating film/transparent adhesion layer/transparent panel.

Comparative Example 2

The same manner as in Comparative Example 1 was performed except that the second light-modulating film was used instead of the first light-modulating film to thereby obtain an interlayer film structure and a laminated panel structure. The laminated panel structure had a laminated structure of transparent panel/transparent adhesion layer/second light-modulating film/transparent adhesion layer/transparent panel.

Comparative Example 3

The following resin film (4) was prepared as a resin film for a transparent adhesion layer, in addition to the resin film (1) having a thickness of 0.76 mm. The same first light-modulating film and transparent panels as in Example 1 were prepared.

Transparent adhesion layer (resin film (4)): "S-LEC Solar Control Film" manufactured by Sekisui Chemical Co., Ltd., thickness 0.76 mm The resin film (1), the first light-modulating film, and the resin film (4) were superimposed in the listed order, and thermocompression bonded under the same conditions as in Example 1 and thus these were integrated, to thereby obtain an interlayer film structure, and thereafter a laminated panel structure was obtained in the same manner as in Example 1. The laminated panel structure had a laminated structure of transparent panel/transparent adhesion layer/first light-modulating film/transparent adhesion layer/transparent panel.

Comparative Example 4

The same manner as in Comparative Example 3 was performed except that the second light-modulating film was used instead of the first light-modulating film to thereby obtain an interlayer film structure and a laminated panel structure. The laminated panel structure had a laminated structure of transparent panel/transparent adhesion layer/second light-modulating film/transparent adhesion layer/transparent panel.

Comparative Example 5

Two of the resin films (1) each having a thickness of 0.76 mm were each prepared as a resin film for a transparent adhesion layer. The same first light-modulating film and transparent panels as in Example 1 were prepared.

The resin film (1), the first light-modulating film, and the resin film (1) were superimposed in the listed order, and thermocompression bonded under the same conditions as in Example 1 and thus these were integrated, to thereby obtain an interlayer film structure. The resulting interlayer film structure was used to produce a laminated panel structure by the same method as in Example 1. The resulting laminated panel structure had a laminated structure of transparent panel/transparent adhesion layer/first light-modulating film/transparent adhesion layer/transparent panel.

Comparative Example 6

The same manner as in Comparative Example 5 was performed except that the second light-modulating film was used instead of the first light-modulating film to thereby obtain an interlayer film structure and a laminated panel structure. The laminated panel structure had a laminated structure of transparent panel/transparent adhesion layer/second light-modulating film/transparent adhesion layer/transparent panel.

The visible light transmittance, the haze value, and the Tds were measured with respect to each of the laminated panel structures obtained in Examples and Comparative Examples, when the first and second light-modulating films were switched between voltage ON and voltage OFF. The results are shown in Table 1.

TABLE 1

|  |  | Example 1 | Example 2 | Comparative Example 1 | Comparative Example 2 | Comparative Example 3 | Comparative Example 4 | Comparative Example 5 | Comparative Example 6 |
| --- | --- | --- | --- | --- | --- | --- | --- | --- | --- |
| Transparent panel | Thickness (mm) | 2.5 | 2.5 | 2.5 | 2.5 | 2.5 | 2.5 | 2.5 | 2.5 |
| Second surface-transparent resin layer | Thickness (mm) | 0.38 | 0.38 | 0.76 | 0.76 | 0.76 | 0.76 | 0.76 | 0.76 |

TABLE 1-continued

|  |  | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| Second light-modulating film | Thickness (mm) | 0.4 | 0.4 | — | 0.4 | — | 0.4 | — | 0.4 |
| Internal transparent resin layer | Thickness (mm) | 0.38 | 0.38 | — | — | — | — | — | — |
| First light-modulating film | Thickness (mm) | 0.4 | 0.4 | 0.4 | — | 0.4 | — | 0.4 | — |
| First surface-transparent resin layer | Thickness (mm) | 0.38 | 0.38 | 0.76 | 0.76 | 0.76 | 0.76 | 0.76 | 0.76 |
| Transparent panel | Thickness (mm) | 2.5 | 2.5 | 2.5 | 2.5 | 2.5 | 2.5 | 2.5 | 2.5 |
| Total thickness | Thickness (mm) | 6.94 | 6.94 | 6.92 | 6.92 | 6.92 | 6.92 | 6.92 | 6.92 |
| Evaluation results |  |  |  |  |  |  |  |  |  |
| First light-modulating film: ON | Tv(%) | 37.4 | 33.8 | — | — | — | — | — | — |
| Second light-modulating film: ON | Tds(%) | 44.7 | 41.9 | — | — | — | — | — | — |
|  | Haze(%) | 5.6 | 5.2 | — | — | — | — | — | — |
| First light-modulating film: ON | Tv(%) | 0.4 | 0.4 | 15.0 | — | 73.5 | — | 72.1 | — |
| Second light-modulating film: OFF | Tds(%) | 14.3 | 14.5 | 23.5 | — | 58.0 | — | 65.0 | — |
|  | Haze(%) | 35.0 | 33.1 | 5.2 | — | 3.3 | — | 4.3 | — |
| First light-modulating film: OFF | Tv(%) | 0.0 | 0.0 | 0.2 | 0.1 | 0.2 | 0.5 | 0.9 | 0.9 |
| Second light-modulating film: OFF | Tds(%) | 2.6 | 2.3 | 2.2 | 9.9 | 2.3 | 11.4 | 9.5 | 17.3 |
|  | Haze(%) | 99.0 | 99.2 | 98.5 | 32.1 | 98.3 | 32.3 | 98.0 | 34.9 |
| First light-modulating film: OFF | Tv(%) | 0.5 | 0.4 | — | 9.5 | — | 45.5 | — | 43.9 |
| Second light-modulating film: ON | Tds(%) | 43 | 3.8 | — | 21.2 | — | 45.0 | — | 52.4 |
|  | Haze(%) | 98.9 | 99.2 | — | 3.9 | — | 3.1 | — | 3.5 |

\* First light-modulating film is in a light-transmission mode at voltage ON or in a light-scattering mode at voltage OFF.
\* Second light-modulating film is in a light-transmission mode at voltage ON or in a light-shielding mode at voltage OFF.

As shown in Table 1, in each of Examples, when the first light-modulating film was switched to voltage ON, the second light-modulating film was switched to voltage ON to enable higher light transmissiveness and a higher visibility state to be achieved, and furthermore allow the Tds value to be equal to or less than a certain value and also enable certain heat insulation ability to be ensured. When the second light-modulating film was switched to voltage OFF during the first light-modulating film was at voltage ON, not only the Tds value was more reduced to allow favorable heat insulation ability to be ensured, but also visible light transmittance, although was low, was equal to or more than a certain value, and a certain sense of openness could also be obtained. On the other hand, when the first light-modulating film was switched to voltage OFF, the second light-modulating film was also switched to voltage OFF to thereby allow a low Tds value to be obtained, and solar radiation could be sufficiently shielded. Accordingly, the laminated panel structure of each of Examples could obtain a sense of openness and also ensure heat insulation ability by mode switching, and furthermore could also ensure high visibility depending on the mode thereof.

On the contrary, in Comparative Examples 1, 3, and 5 where no second light-modulating film was included, while a low Tds value was thus obtained to enable solar radiation to be sufficiently shielded when the first light-modulating film was switched to voltage OFF, the Tds value was high and a sense of openness was difficult to obtain with sufficient heat insulation ability being ensured when the first light-modulating film was switched to voltage ON. In Comparative Examples 2, 4, and 6 where no first light-modulating film was included, the Tds value could not be thus sufficiently low even in a light-shielding mode and heat insulation ability was insufficient.

REFERENCE SIGNS LIST 10 laminated panel structure
11 interlayer film structure
12A, 13A, 21A, 22A, 31A, 32A, 33A peripheral edge
12, 13 transparent panel
21 first light-modulating film
22 second light-modulating film
26A to 26D segment
30 internal transparent adhesion layer
31 first surface-transparent adhesion layer
32 second surface-transparent adhesion layer
35 sealing material
35A first sealing material
35B second sealing material
37 touch sensor
L distance

The invention claimed is:
1. An interlayer film structure comprising:
a first light-modulating film capable of switching between light transmission and light scattering; and
a second light-modulating film capable of adjusting a visible light transmittance,
wherein:
the first light-modulating film and the second light-modulating film are arranged in a thickness direction;
a solar direct transmittance (Tds) configured to be measured in the first light-modulating film in a light-transmission mode, in a laminated panel structure obtained by bonding two sheets of clear glass having a thickness of 2.5 mm with the interlayer film structure interposed therebetween, is adjustable to 55% or less; and
a haze value configured to be measured in the first light-modulating film in the light-transmission mode, in the laminated panel structure obtained by bonding the two sheets of clear glass having the thickness of 2.5 mm with the interlayer film structure interposed therebetween, is adjustable to 40% or less.

2. The interlayer film structure according to claim 1, wherein the second light-modulating film is disposed closer to an outdoor side than the first light-modulating film.

3. The interlayer film structure according to claim 1, further comprising an internal transparent adhesion layer that is disposed between and configured to bond the first light-modulating film and the second light-modulating film.

4. The interlayer film structure according to claim 3, wherein the first light-modulating film and the second light-modulating film are thermocompression bonded.

5. The interlayer film structure according to claim 1, further comprising a surface-transparent adhesion layer on an outermost surface of the interlayer film structure.

6. The interlayer film structure according to claim 1, wherein the visible light transmittance configured to be measured in the first light-modulating film in the light-transmission mode, in the laminated panel structure obtained by bonding the two sheets of clear glass having the thickness of 2.5 mm with the interlayer film structure interposed therebetween, is adjustable to 1% or less and 10% or more by the second light-modulating film.

7. The interlayer film structure according to claim 1, wherein respective peripheral edges of the first light-modulating film and the second light-modulating film are configured to be disposed on an inner circumferential side, 10 mm or more from peripheral edges of the two sheets of clear glass.

8. The interlayer film structure according to claim 7, further comprising a sealing material disposed on an outer circumferential side with respect to the first light-modulating film and the second light-modulating film.

9. The interlayer film structure according to claim 1, further comprising a touch sensor configured to control the first light-modulating film or the second light-modulating film, in an interior of the interlayer film structure.

10. The interlayer film structure according to claim 1, wherein the first light-modulating film is divided into a plurality of independently controllable segments.

11. The interlayer film structure according to claim 1, wherein the first light-modulating film is a polymer dispersion liquid crystal film or a polymer network liquid crystal film.

12. The interlayer film structure according to claim 1, wherein the second light-modulating film is an electrochromic film, a suspended particle device film, or an electrophoresis film.

13. A laminated panel structure comprising:
   the interlayer film structure according to claim 1; and
   the two sheets of clear glass,
   wherein the interlayer film structure is sandwiched between the two sheets of clear glass.

14. The laminated panel structure according to claim 13, wherein the laminated panel structure has a thickness of 7 mm or less.

15. A car roof glass comprising the laminated panel structure according to claim 13.

16. A building comprising the laminated panel structure according to claim 13.

17. The laminated panel structure according to claim 13, further comprising:
   a first surface-transparent adhesion layer;
   an internal transparent adhesion layer; and
   a second surface-transparent adhesion layer,
   wherein a first of the two sheets of clear glass, the first surface-transparent adhesion layer, the first light-modulating film, the internal transparent adhesion layer, the second light-modulating film, the second surface-transparent adhesion layer, and a second of the two sheets of clear glass are arranged in this order.

18. The interlayer film structure according to claim 1, further comprising:
   a first surface-transparent adhesion layer;
   an internal transparent adhesion layer; and
   a second surface-transparent adhesion layer,
   wherein the first surface-transparent adhesion layer, the first light-modulating film, the internal transparent adhesion layer, the second light-modulating film, and the second surface-transparent adhesion layer are arranged in this order.

* * * * *